(12) United States Patent
Stevenson

(10) Patent No.: US 7,861,165 B2
(45) Date of Patent: Dec. 28, 2010

(54) PRINTING APPARATUS AND METHOD

(75) Inventor: Duncan I. Stevenson, St. Albans (GB)

(73) Assignee: Xerox Corporation, Norwalk, CT (US)

( * ) Notice: Subject to any disclaimer, the term of this patent is extended or adjusted under 35 U.S.C. 154(b) by 1319 days.

(21) Appl. No.: 11/300,840

(22) Filed: Dec. 15, 2005

(65) Prior Publication Data

US 2007/0143670 A1 Jun. 21, 2007

(51) Int. Cl.
*G06F 15/00* (2006.01)

(52) U.S. Cl. .................. 715/273; 715/234; 715/243; 715/274

(58) Field of Classification Search .......... 715/273, 715/234, 274, 243
See application file for complete search history.

(56) References Cited

U.S. PATENT DOCUMENTS

| | | | | |
|---|---|---|---|---|
| 5,519,436 A * | 5/1996 | Munson | ................... | 348/14.15 |
| 5,842,793 A * | 12/1998 | Katayama et al. | .............. | 400/88 |
| 5,995,201 A * | 11/1999 | Sakaguchi | .................... | 355/55 |
| 6,343,277 B1 * | 1/2002 | Gaus et al. | .................... | 705/37 |
| 6,560,621 B2 * | 5/2003 | Barile | ......................... | 715/234 |
| 7,002,703 B2 * | 2/2006 | Parry | .......................... | 358/1.15 |
| 7,210,099 B2 * | 4/2007 | Rohrabaugh et al. | ........ | 715/249 |
| 7,287,220 B2 * | 10/2007 | Kaasila et al. | ............... | 715/201 |
| 7,412,647 B2 * | 8/2008 | Sellers et al. | ................ | 715/253 |
| 2002/0135806 A1 * | 9/2002 | Yoshino | ..................... | 358/1.15 |
| 2003/0009740 A1 * | 1/2003 | Lan | ........................... | 717/102 |
| 2003/0011823 A1 * | 1/2003 | Quintana et al. | ............ | 358/3.06 |
| 2003/0051615 A1 * | 3/2003 | Denoue et al. | ................. | 101/45 |
| 2003/0128873 A1 * | 7/2003 | Bronson | ..................... | 382/163 |
| 2004/0071478 A1 * | 4/2004 | Katamoto | .................... | 399/82 |
| 2004/0105127 A1 * | 6/2004 | Cudd et al. | ................ | 358/1.18 |
| 2004/0177323 A1 * | 9/2004 | Kaasila et al. | .............. | 715/513 |
| 2006/0106838 A1 * | 5/2006 | Ayediran et al. | ............ | 707/101 |
| 2006/0200763 A1 * | 9/2006 | Michaelsen et al. | ......... | 715/523 |
| 2006/0212410 A1 * | 9/2006 | Tokarski et al. | ............. | 705/408 |
| 2006/0221369 A1 * | 10/2006 | Inoue | ......................... | 358/1.13 |

OTHER PUBLICATIONS

Borchar, et al., "Layout Rules for Graphical Web Documents," Comput. & Graphics, vol. 20, No. 3, p. 415-426, published 1996.*

* cited by examiner

*Primary Examiner*—Amelia Rutledge
(74) *Attorney, Agent, or Firm*—Fay Sharpe LLP

(57) ABSTRACT

A printing apparatus and method for capturing and formatting the content of a web page. The apparatus and method determining if a portrait formatted representation of the web page and a landscape formatted representation of the web page, include equivalent content, and outputting the portrait formatted representation of the web page if the portrait formatted representation has the equivalent content of the landscape formatted representation. Otherwise outputting a landscape formatted representation of the said web page.

10 Claims, 8 Drawing Sheets

PRINTING APPARATUS AND METHOD

BACKGROUND

Web pages are typically formatted in a standard landscape or portrait fashion. Landscape formatted web pages provide a user with a monitor displayed content that is wider than it is high. Portrait formatted web pages provide a user with a monitor displayed content that is higher than it is wide. Most web pages are formatted in a landscape fashion to accommodate the demands of a landscape dimensioned screen.

Printers typically have the ability to print in a landscape or portrait formatted fashion. However, most printers have their default format set to print in a portrait mode because this is the typical formatting requirement for word processing software applications and other similar text based software applications.

To print a web page, a user typically will follow a standard procedure for printing files that does not include the selection of an appropriate formatting, i.e. either landscape or portrait. Consequently, the default printing format will be a portrait formatted print job. Because most web pages are formatted in a landscape fashion, the printed web page will normally be printed in a portrait formatted fashion and a right portion of the web page will not be printed.

One way to insure all the content of a landscape formatted web page is printed involves the use of wrap around text, whereby the content of the landscape formatted web page outside of the portrait formatted margin is wrapped around to the next line within the portrait formatted margins. Some web sites are configured to provide this wrap around feature, however many do not wrap around the web content and the portrait formatted printer output excludes the right portion of the landscape formatted web page.

BRIEF DESCRIPTION

A computer program product comprising a computer-usable data carrier storing instruction that, when executed by a computer, causes the computer to perform a method comprising capturing the content of a web page; determining if a portrait formatted representation of the said web page and a landscape formatted representation of the said web page, include equivalent content; and outputting the portrait formatted representation of the web page if the said portrait formatted representation has the equivalent content of the said landscape formatted representation, otherwise outputting a landscape formatted representation of the said web page.

A printing method comprising capturing the content of a web page; determining if a portrait formatted representation of the said web page and a landscape formatted representation of the said web page, include equivalent content; and outputting the portrait formatted representation of the web page if the said portrait formatted representation has the equivalent content of the said landscape formatted representation, otherwise outputting a landscape formatted representation of the said web page.

DETAILED DESCRIPTION

Provided below is a detailed description of various exemplary embodiments of this disclosure. These embodiments provide a printing apparatus and method for printing a web page that includes printing the web page with the appropriate printed page format.

Figure 1:
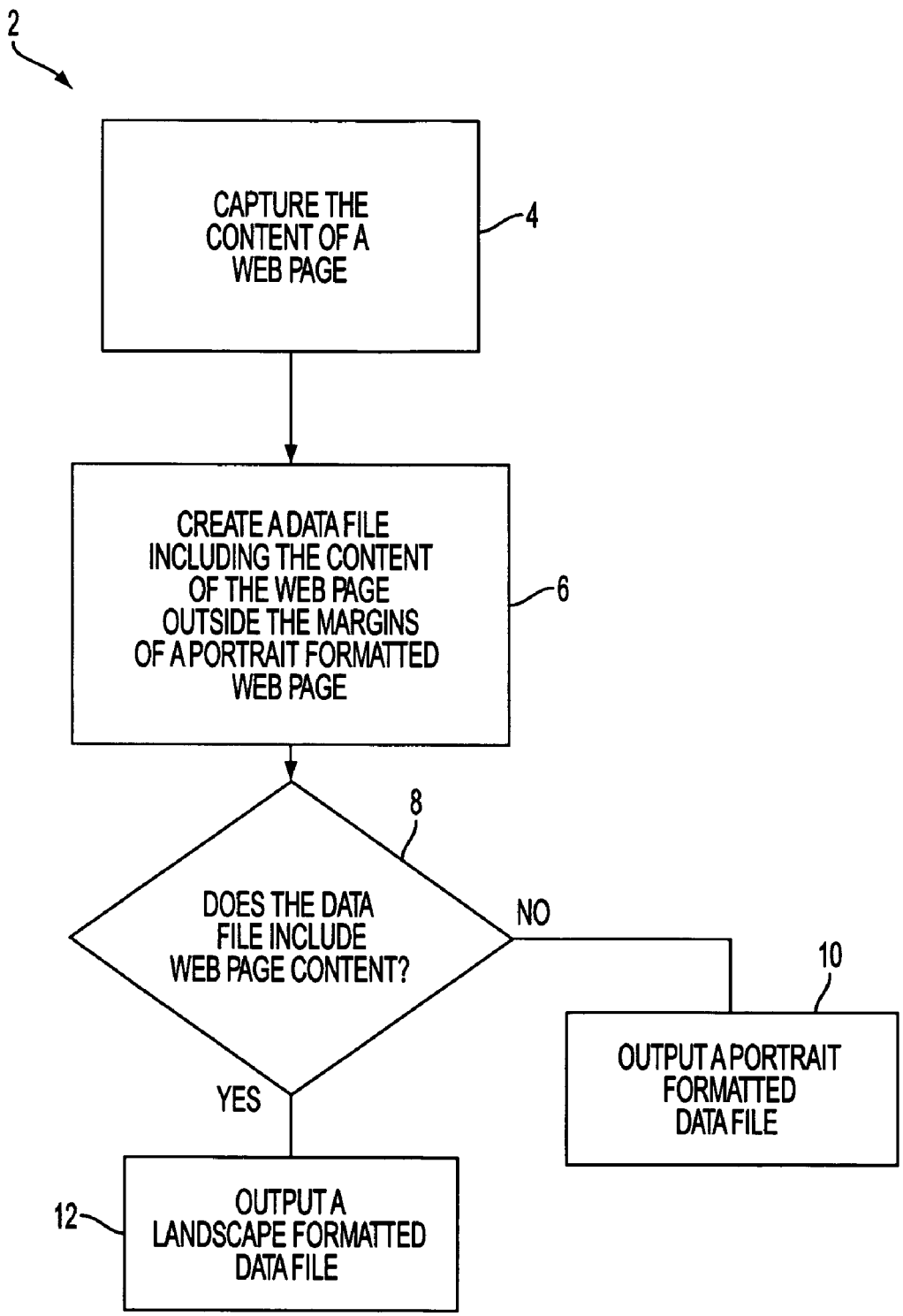
FIG. 1 illustrates a flow chart according to one exemplary embodiment.

With reference to FIG. 1, illustrated is a flow chart 2 representing a printing apparatus and method according to one exemplary embodiment of this disclosure. This printing method can be implemented in various ways as is known to those of skill in the art. Specifically, the flow chart 2 is implemented with a computer program product, the computer program product including a computer-usable data carrier that stores computer instructions to be executed by a computer. The computer program product can be implemented via software or firmware installed on a computer or a printing device.

With further reference to FIG. 1, the printing method and computer program product is now described. Initially, the computer program product captures 4 the content of a web page to be printed. Next, a data file is created 6 including the content of the web page outside the margins of a portrait formatted web page. At this point the computer program product determines 8 if the data file including the content of the web page outside the margins of a portrait formatted web page, includes web page content. If the data file includes web page content, the computer program outputs 12 a landscape formatted data file. If the data file does not include web page content, indicating the web page is portrait formatted, the computer program outputs 10 a portrait formatted data file.

Subsequent to generating the output data file discussed in the preceding paragraph, the computer program outputs the data file to a printing device which produces a portrait or landscape formatted printed output. In effect, this printing method and apparatus provides a web page printed output which more accurately reproduces the original web page formatting. More specifically, if the web page format is portrait, the printing method and apparatus produces an output data file representative of the web page portrait formatted. If the web page portrait formatted is landscape, the printing method and apparatus produces an output data file representative of the web page landscape formatted.

To better illustrate the printing method and apparatus described with reference to FIG. 1, further discussion is now provided with reference to FIG. 2, FIG. 3 and FIG. 4.

Figure 2:
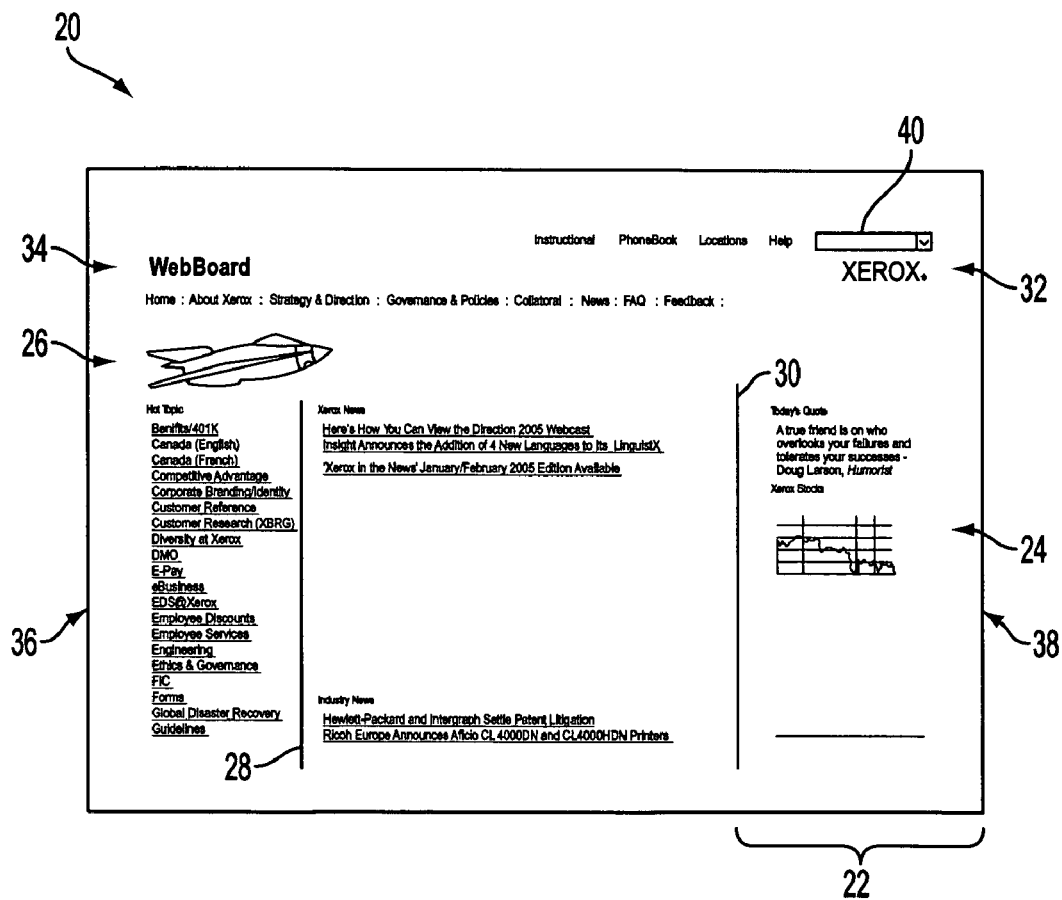
FIG. 2 illustrates a landscape formatted web page.

FIG. 2 illustrates a landscape formatted web page 20 as it would appear on a computer monitor which is operatively connected to a computer operatively connected to an internet server. The internet server provides a user, i.e. computer, with access to the web page 20 illustrated. As illustrated in FIG. 2, the landscape formatted web page 20 is wider than it is tall, which is representative of a landscape formatted page. With reference to FIG. 2, reference items for purposes of discussion include a "WebBoard" heading 34, art work 26, vertical line 28, drop down box 40, bolded company 32, graphical illustration 24, vertical line 36, and vertical line 38. In addition, a right area 22 of the web page is indicated.

Figure 3:
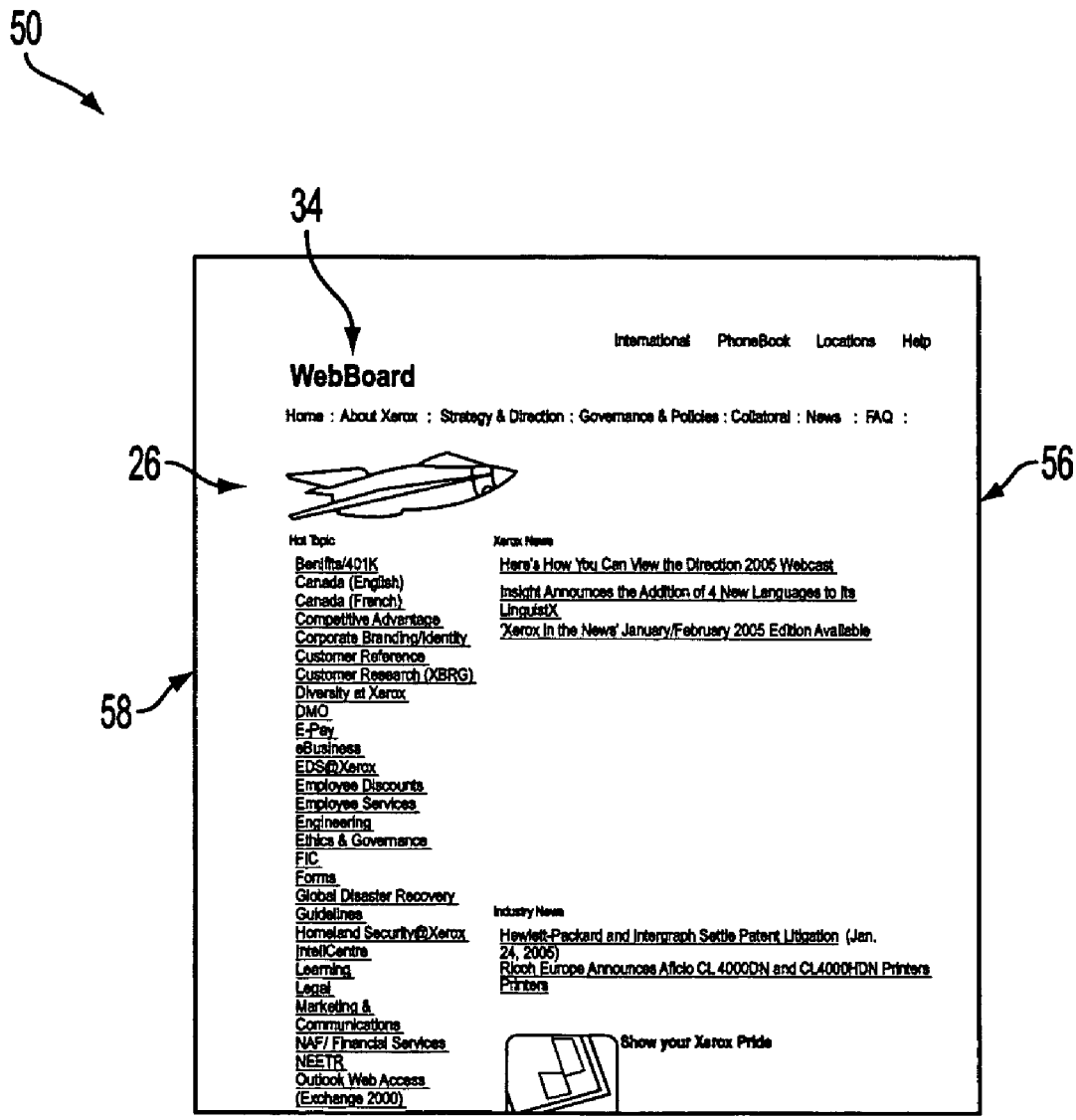
FIG. 3 illustrates a portrait formatted web page.

With reference to FIG. 3, illustrated is a portrait formatted output of a web page 50 which includes content as illustrated in FIG. 2. As illustrated in FIG. 3, the portrait formatted web page 50 output is taller than it is wide, which is representative of a portrait formatted page. With further reference to FIG. 3, reference items for purposes of discussion include a "Web-Board" heading 34, art work 26, vertical bar 56 and vertical bar 58.

Figure 4:
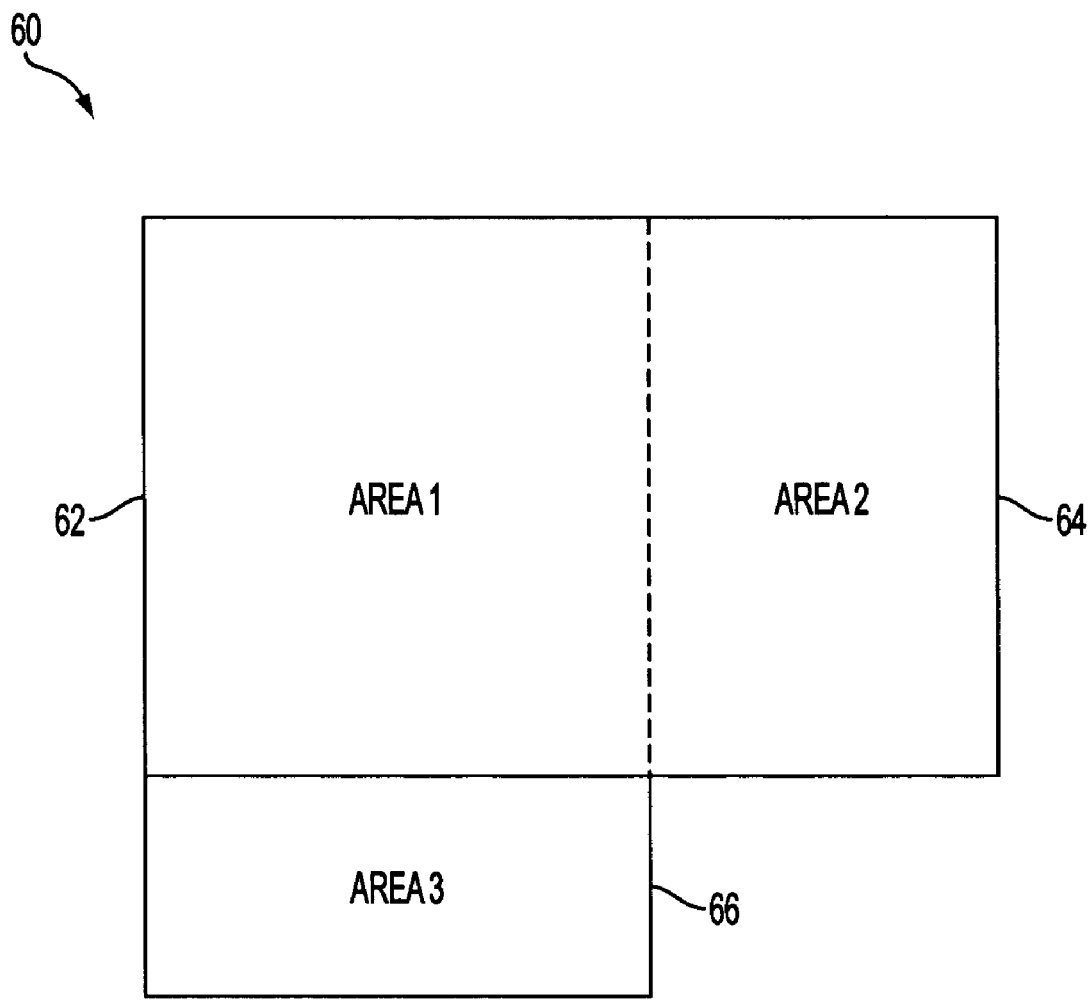
FIG. 4 illustrates a landscape and portrait area diagram.

FIG. 4 illustrates the areas covered by a landscape formatted web page for printing and a portrait formatted web page for printing. Specifically, a portrait formatted page layout includes Area 1 62 and Area 3 66, but not Area 2 64. A landscape formatted page layout includes Area 1 62 and Area 2 64, but not Area 3 66. The overlay 60 illustrated in FIG. 4 depicts a landscape formatted page laid directly on top of a portrait formatted page.

As briefly explained in the Background section of this disclosure, a problem associated with printing a web page as illustrated in FIG. 2, i.e. a landscape formatted web page, is computers and their associated drivers are generally configured to print a portrait formatted page unless the user specifically configures the software to print in a format different than the default format, i.e. portrait format. Consequently, a landscape formatted web page as illustrated in FIG. 2, will print as the portrait formatted output illustrated in FIG. 3. By comparing FIG. 2 and FIG. 3, it should be noted that the drop down menu 40, the company name, vertical bar 30, and graphical illustration 24 are not included as part of the portrait formatted web page 50 of FIG. 3. In effect, Area 2 64 of the overlay 60 illustrated in FIG. 4 is omitted from the portrait formatted web page 50.

To provide a landscape formatted print output for a landscape formatted web page, and a portrait formatted print output for a web page portrait formatted, the printing method and apparatus previously described with reference to FIG. 1 is provided. This printing method and apparatus operates as follows with reference to FIGS. 1, 2, 3 and 4.

Initially, the computer program product captures the content of a web page 4 to be printed. This includes Area 1 62 and Area 2 64 as illustrated in FIG. 4. Next, a data file is created 6 including the content of the web page outside the margins of a portrait formatted web page. This content is defined by Area 2 64 as illustrated in FIG. 4. Next, the computer program determines 8 if the data file representing Area 2 64 includes web page content. If Area 2 64 includes web page content, the computer program determines the web page is landscape formatted and outputs 12 a landscape formatted data file for printing. If the computer program determines the data file representing Area 2 64 does not include web page content, the computer program outputs 10 a portrait formatted data file for printing.

Figure 5:
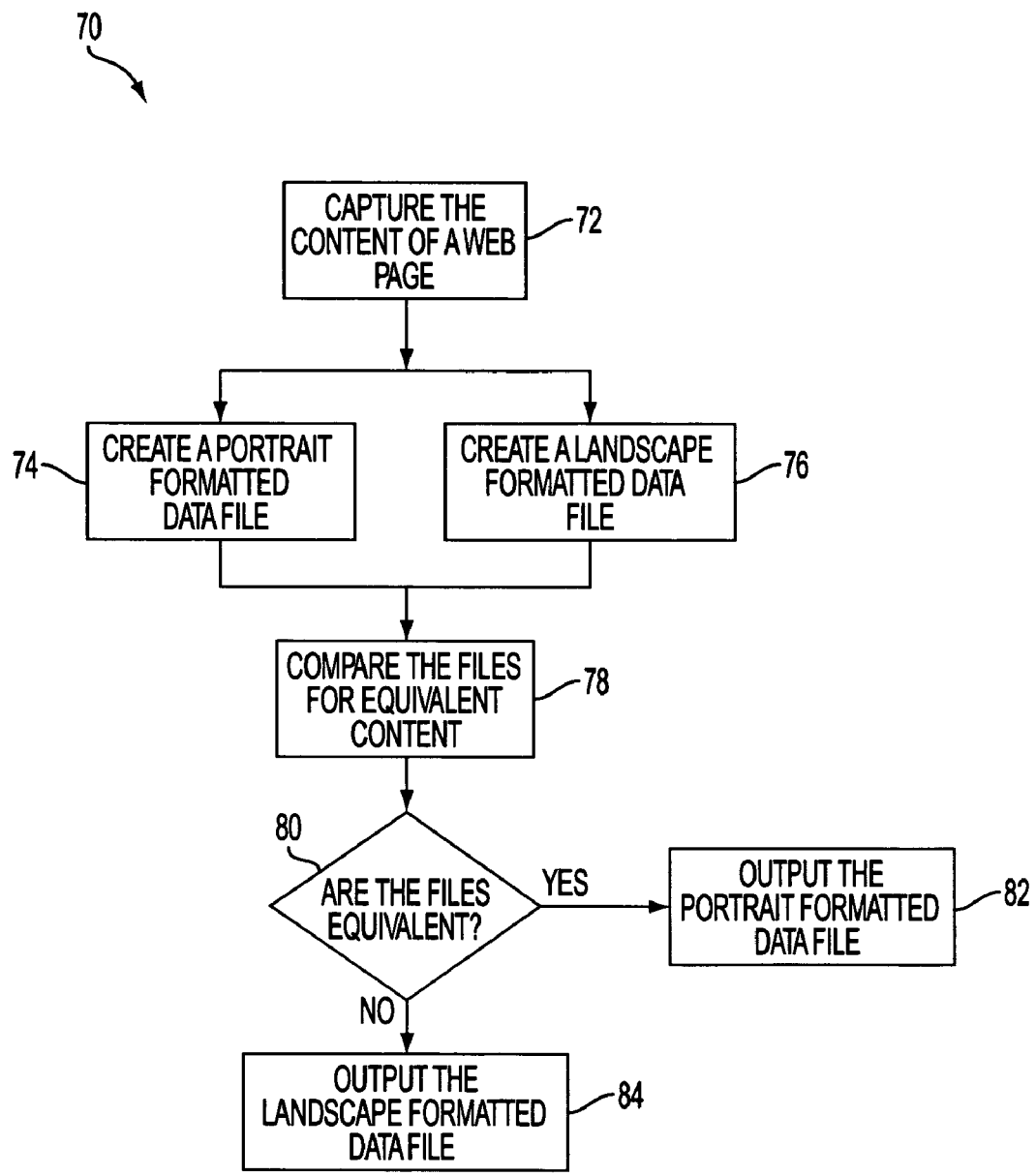
FIG. 5 illustrates a flow chart according to another exemplary embodiment.

With reference to FIG. 5, illustrated is a flow chart 70 representing a printing method and apparatus according to another embodiment of this disclosure. The general principle of operation is similar to the embodiment illustrated and described with reference to FIG. 1.

The computer program initially captures 72 the content of a web page for printing. Next, the computer program generates 74 a data file representative of the captured web page content portrait formatted, and the computer program generates 76 a data file representative of the captured web page content landscape formatted. Next, the portrait formatted data file and landscape formatted data file are compared 78 to determine 80 if the files have equivalent content. If the portrait and landscape formatted data files have equivalent content, the computer program outputs 82 a portrait data file for printing. If the portrait and landscape formatted data files do not have equivalent content, the computer program outputs 84 a landscape data file for printing.

Figure 6:
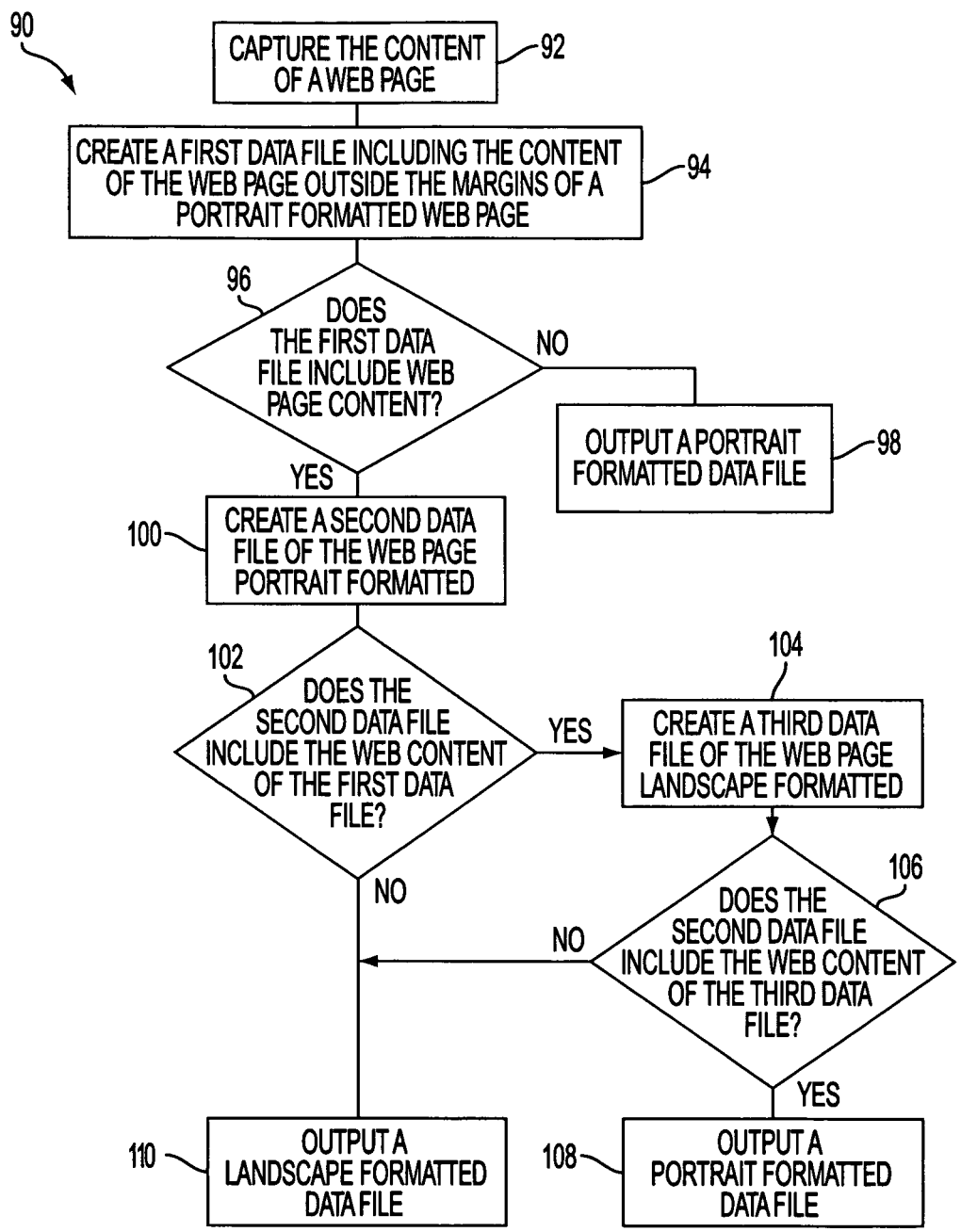
FIG. 6 illustrates a flow chart according to another exemplary embodiment.

With reference to FIG. 6, illustrated is a flow chart 90 representative of another exemplary embodiment of a printing apparatus and method according to this disclosure.

Initially, the computer program captures 92 the content of a web page for printing. Next, the computer program creates 94 a first data file including the content of the web page outside the margins of a portrait formatted web page. Next, the computer program determines 96 if the first data file includes web page content. If no web page content is included, the computer program outputs 98 a portrait formatted data file for printing. If the first data includes web page content, the computer program creates 100 a second data file of the web page portrait formatted.

The web content of a second data file is then compared 102 with the web content of the first data file. If the second data file does not include the web content of the first data file, the computer program outputs 110 a landscape formatted data file. It should be noted that comparing the portrait formatted web page content, i.e. second data file, with the content of the web page outside the margins of a portrait formatted web page, i.e. first data file, provides a basis for determining if web content is omitted form the portrait formatted web page. If the computer program determines the second data file includes the web content of the first data file, then the computer program creates 104 a third data file representative of the web page landscape formatted.

Next, the computer compares 106 the second data file with the third data file to determine if the portrait formatted web page content, i.e. second data file, includes the content of the landscape formatted web page, i.e. third data file. If the second data file does not include the web content of the third data file, the computer program outputs 110 a landscape formatted data file for printing. If the second data file does include the web content of the third data file, the computer program outputs 108 a portrait formatted data file for printing.

Figure 7:
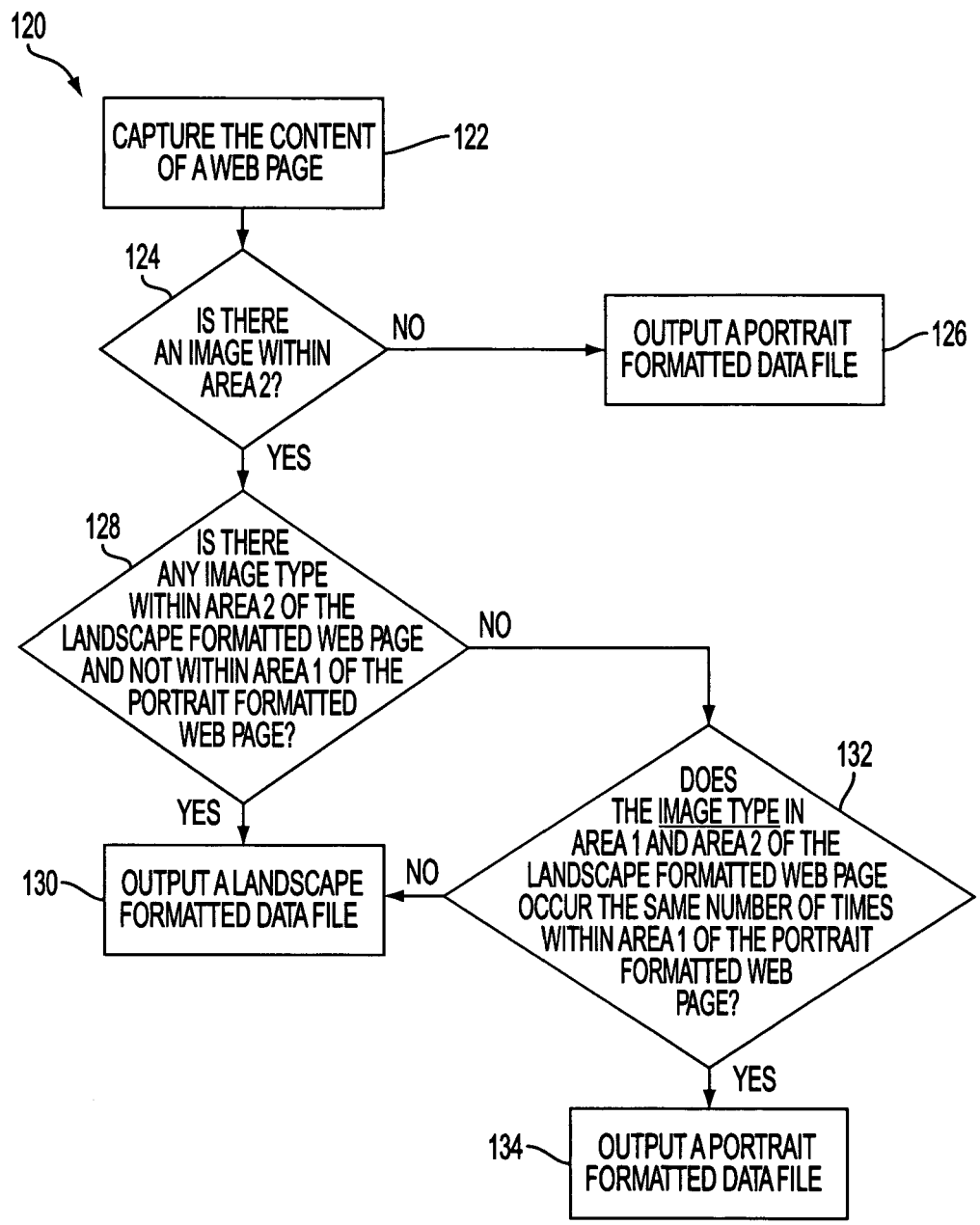
FIG. 7 illustrates a flow chart according to another exemplary embodiment.

With reference to FIG. 7, illustrated is a flow chart 120 representative of another exemplary embodiment of this disclosure.

Initially, the computer program captures 122 the content of a web page to be printed. Next, the computer program determines 124 if there is an image within Area 2 of the captured web content. If there is no image within Area 2 of the captured web content, the computer program outputs 126 a portrait formatted data file. If there is image within Area 2 of the captured web content, the computer program goes to an image type comparison 128 step.

The computer program determines 128 the image types included within Area 2 of the landscape formatted web page. Image types could include half tone, line graphics, etc. The computer program also determines 128 if Area 1 of a portrait formatted web page includes the image types of Area 2 of the landscape formatted web page. If Area 2 of the landscape formatted web page includes image types not within Area 1 of the portrait formatted web page, the computer program outputs 130 a landscape formatted data file. Alternatively, if Area 1 of the portrait formatted web page includes the image types within Area 2 of the landscape formatted web page, the compute program counts 132 the number of occurrences of the image types within each respective area.

If the number of occurrences of each image type within the respective areas are equal, the computer program outputs 134 a portrait formatted data file. Alternatively, if the number of occurrences of each image type within the respective areas are not equal, the computer program outputs 130 a landscape formatted data file.

Figure 8:
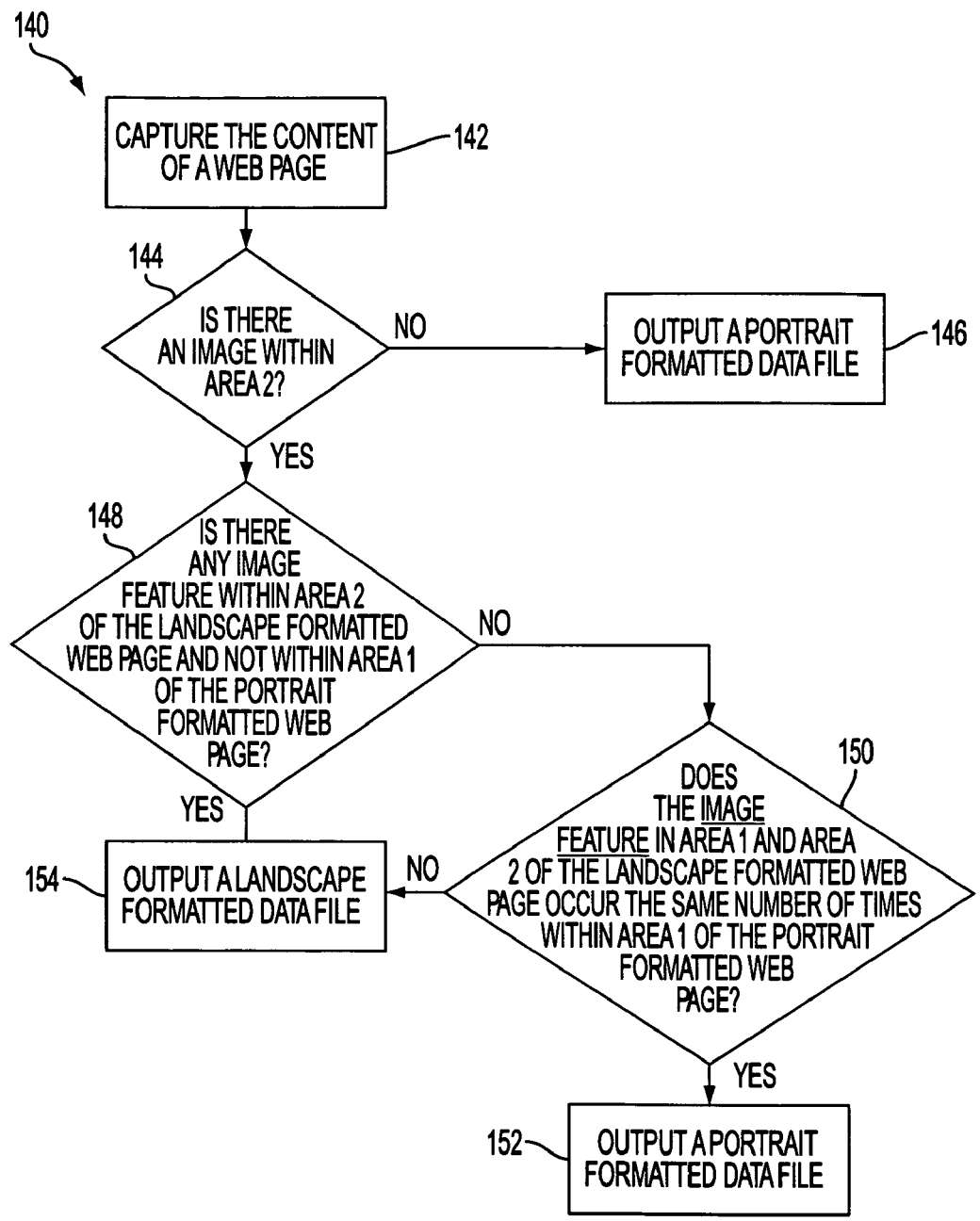
FIG. 8 illustrates a flow chart according to another exemplary embodiment.

With reference to FIG. 8, illustrated is a flow chart representative of another exemplary embodiment of a printing apparatus and method according to this disclosure. This exemplary embodiment operates identically to the exemplary embodiment described with reference to FIG. 7, except the image features, not the image types, within Area 2 64 of the landscaped formatted web page and Area 1 62 of the portrait formatted web page are compared. Image features include blocks of a specific color, etc.

Initially, the computer program captures 142 the content of a web page to be printed. Next, the computer program determines 144 if there is an image within Area 2 of the captured web content. If there is no image within Area 2 of the captured web content, the computer program outputs 146 a portrait formatted data file. If there is image within Area 2 of the captured web content, the computer program goes to an image feature comparison 148 step.

The computer program determines 148 the image features included within Area 2 of the landscape formatted web page. The computer program also determines 148 if Area 1 of a portrait formatted web page includes the image features of Area 2 of the landscape formatted web page. If Area 2 of the landscape formatted web page includes image features not within Area 1 of the portrait formatted web page, the computer program outputs 154 a landscape formatted data file. Alternatively, if Area 1 of the portrait formatted web page includes the image features within Area 2 of the landscape formatted web page, the compute program counts 150 the number of occurrences of the image features within each respective area.

If the number of occurrences of each image feature within the respective areas are equal, the computer program outputs 152 a portrait formatted data file. Alternatively, if the number of occurrences of each image feature within the respective areas are not equal, the computer program outputs 154 a landscape formatted data file.

Other techniques for comparing the content of a portrait formatted data file and landscape formatted data file, representative of a captured web page image, include vertical line comparison, pixel value summation comparison and accessing a knowledge base.

A vertical line comparison printing apparatus and method determines if the number of web content dividing vertical lines within the portrait formatted data file is equivalent to the number of content dividing vertical lines within the landscape formatted data.

A pixel value summation comparison printing apparatus and method determines if the sum of the pixel values within the portrait formatted data file is approximately equal to the sum of the pixel values within the landscape formatted data file.

A knowledge base printing apparatus and method accesses a knowledge base to determine if the portrait formatted data file is equivalent to the landscape formatted data file.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing method for printing a web page accessed from a computer operatively connected to a web, the printing method comprising:

a) a user of the computer accessing the web page using the computer operatively connected to the web, the web page displayed on a display associated with the computer;

b) the user of the computer selectively initiating the execution of a program to print the displayed web page on the printing device using a portrait format or a landscape format, the user providing no instructions to the program which format to use to print the web page on the printing device;

c) the program capturing the content of the web page;

d) the program generating a portrait formatted representation of the captured content of the web page and generating a landscape formatted representation of the captured content of the web page;

e) the program determining if the portrait formatted representation and the landscape formatted representation have equivalent content;

f) the program outputting the portrait formatted representation of the web page to the printing device if the portrait formatted representation has the equivalent content of the landscape formatted representation, otherwise the program outputting the landscape formatted representation of the web page to the printing device; and g) the printing device printing the web page using the outputted representation.

2. The printing method according to claim 1, step c) further comprising:

d1) creating a portrait formatted data file based on the captured content of a web page; and d2) creating a landscape formatted data file based on the captured content of a web page.

3. The method according to claim 2, step e) further comprising:

determining if the number of content dividing vertical lines within the portrait formatted data file is equivalent to the number of content dividing vertical lines within the landscape formatted data file.

4. The method according to claim 2, step e) further comprising:

determining if the sum of the pixel values within the portrait formatted data file is approximately equal to the sum of the pixel values within the landscape formatted data file.

5. The method according to claim 2, step e) further comprising:

accessing a knowledge base to determine if the portrait formatted data file is equivalent to the landscape formatted data file.

6. The printing method according to claim 1, steps d), e) and f) further comprising:

creating a first data file comprising the content of the web page outside the margins of the portrait formatted representation of the web page;

outputting the portrait formatted representation of the web page to the printing device if the first data file does not include web page content, otherwise creating a second data file of the web page portrait formatted;

outputting the landscape formatted representation of the web page to the printing device if the second data file does not include the web content of the first data file, otherwise create a third data file of the web page landscape formatted; and outputting the landscape formatted representation of the web page if the second data file does not include the web content of the third data file, otherwise outputting the portrait formatted data file representation of the web page.

7. The printing method according to claim 1, steps d), e) and f) further comprising:

creating a first data file comprising the content of the web page outside the margins of a portrait formatted representation of the web page;

outputting the portrait formatted representation of the web page if the first data file includes content of the web page outside the margins of the portrait formatted representation of the web page; otherwise creating a second data file comprising the content of the portrait formatted representation of the web page; and outputting a landscape formatted representation of the web page if the first data file includes image type and the second data file does not include the image type, otherwise outputting the portrait formatted representation of the web page if the number of occurrences of the image type within the landscape formatted web page is equal to the number of occurrences of the image type within the portrait formatted representation of the web page, otherwise outputting a landscape formatted representation of the web page.

8. The printing method according to claim 7, wherein the image type is defined as web content including halftones or line graphics.

9. The printing method according to claim 1, steps d), e) and f) further comprising:

creating a first data file comprising the content of the web page outside the margins of a portrait formatted representation of the web page;

outputting the portrait formatted representation of the web page if the first data file includes content of the web page outside the margins of a portrait formatted web page; otherwise creating a second data file comprising the content of the portrait formatted representation of the web page; and outputting a landscape formatted representation of the web page if the first data file includes an image feature and the second data file does not include the image feature, otherwise outputting the portrait formatted representation of the web page if the number of occurrences of the image feature within the landscape formatted web page is equal to the number of occurrences of the image feature within the portrait formatted web page, otherwise outputting a landscape formatted representation of the web page.

10. The printing method according to claim 9 wherein the image feature is defined as web content including blocks of a specific color.

* * * * *